(12) United States Patent
Keaveny et al.

(10) Patent No.: US 7,679,531 B2
(45) Date of Patent: *Mar. 16, 2010

(54) SYSTEM AND METHOD OF OPTIMIZING A FIXED-ROUTE TRANSIT NETWORK

(75) Inventors: Ian Keaveny, Burlington (CA); Brad Heide, Mississauga (CA)

(73) Assignee: Trapeze Software Inc., Mississauga, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 12/124,582

(22) Filed: May 21, 2008

(65) Prior Publication Data

US 2008/0288333 A1    Nov. 20, 2008

Related U.S. Application Data

(63) Continuation of application No. 11/443,358, filed on May 31, 2006, now Pat. No. 7,391,341.

(51) Int. Cl.
*G08G 1/123* (2006.01)

(52) U.S. Cl. .............. 340/994; 340/995.19; 701/210
(58) Field of Classification Search .......... 340/994, 340/995.19, 995.21; 701/209–210
See application file for complete search history.

(56) References Cited

U.S. PATENT DOCUMENTS

2005/0004757 A1* 1/2005 Neeman et al. ............. 701/210
2005/0131625 A1* 6/2005 Birger et al. ................ 701/117

* cited by examiner

*Primary Examiner*—Brent Swarthout
(74) *Attorney, Agent, or Firm*—Lang Michener LLP

(57) ABSTRACT

According to an aspect of the invention there is provided a method of optimizing a fixed route on a transit network, comprising the steps of: a) permitting a vehicle providing service on the fixed route to make deviations from the fixed route based on passenger requests; b) tracking the deviations and number of passenger requests corresponding to each deviation; c) submitting information from tracking step b) into a decision-making algorithm; and d) modifying the fixed route to include new stops based on results from the decision-making algorithm, as well as a system for implementing this method.

19 Claims, 3 Drawing Sheets

SYSTEM AND METHOD OF OPTIMIZING A FIXED-ROUTE TRANSIT NETWORK

CROSS-REFERENCE TO RELATED APPLICATION

This application is a continuation of prior U.S. patent application Ser. No. 11/443,358, filed May 31, 2006 now U.S. Pat. No. 7,391,341.

FIELD OF THE INVENTION

The present invention relates to the field of fixed route assignments in a transit network. In particular, it relates to the modification of existing fixed transit routes and stops using permitted deviations in these routes and stops and processing data gathered from these deviations.

BACKGROUND OF THE INVENTION

Public transit networks providing transportation by buses or similar vehicles typically operate these vehicles on a fixed route. The vehicle follows the road network along a predetermined path, and makes stops at predetermined locations. Furthermore, the stops are made at pre-determined times, within the standard fluctuations of traffic and weather conditions.

In many areas, these routes have been in place for many years and the times and locations of the stops along these routes have been in place for a similar length of time. However, in the course of urban development in the areas along a given route, the positioning of the stops may no longer be optimal. It is thus necessary to review the stops and routes on a periodic basis to determine if changes are required to provide optimal service to passengers.

A problem is presented, namely, how to gather the necessary information to develop a proper analysis of the route and stops. Passengers surveys can be conducted, but a great deal of effort and expense must be put into selecting the proper questions for the survey, and the general level of response to surveys is sufficiently low as to render the results of dubious value. Reviewing developments along the route, such as a new shopping or residential complex, can provide some insight regarding general locations for new stops. However, in the absence of information from riders (and potential riders) any changes resulting from this type of review are speculative and may or may not accurately reflect rider habits and desires.

There is a need for a method of optimizing fixed routes on a transit network which is based on data gathered from riders without the need to actually solicit the necessary data from the riders themselves.

SUMMARY OF THE INVENTION

According to an aspect of the invention there is provided a method of optimizing a fixed route on a transit network, comprising the steps of: a) permitting a vehicle providing service on the fixed route to make limited deviations from the fixed route based on passenger requests; b) tracking the deviations and number of passenger requests corresponding to each deviation; c) submitting information from tracking step b) into a decision-making algorithm; and d) modifying the fixed route to include new stops based on results from the decision-making algorithm. Optionally, existing stops may be removed from the fixed route. Optionally, passenger requests may be received either prior to boarding or during travel.

Preferably, riders are permitted to request deviations from the course of the route in addition to requests for deviation in stops along the route. Thus, the modifications to the route may include changes to the course of the route in addition to changes in the stops.

Also preferably, the decision-making algorithm allows limitations on new and existing stops, such as maximum number of stops on a route, maximum number of stops on a specific section of a route, minimum distance between stops, and maximum distance between stops, restrictions to within a defined polygon, or other limitations, when determining potential modifications to the fixed route.

According to another aspect of the invention, there is provided a system capable of executing the above method.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
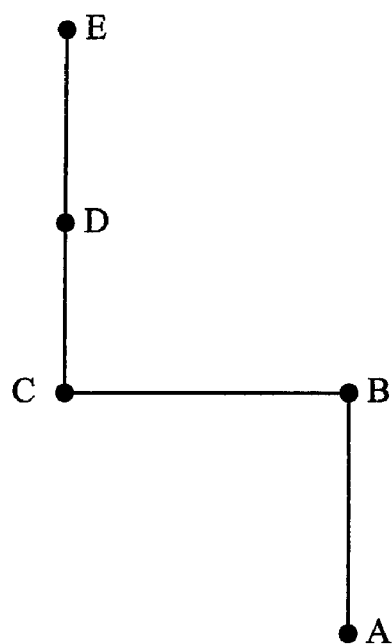
FIG. 1 is a diagram of a five-stop fixed transit route.

The invention is a method of optimizing a fixed route in a transit network, such as the five-stop (A-E) route shown in FIG. 1. The first step is to permit the vehicle to stop at locations along the route which are not currently designated stops in response to passenger requests to embark/disembark the vehicle. These requests are logged, preferably in conjunction with information about the number of passengers embarking/disembarking at the existing stops. It is noted that this type of flexible stopping is already provided as a courtesy service in some transit networks, usually with respect to night-time services, female passengers and/or passengers with physical disabilities.

Figure 2:
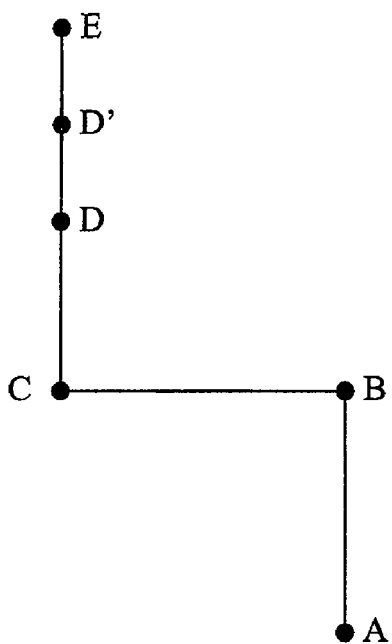
FIG. 2 is a diagram of the transit route of FIG. 1 with an additional stop.
Figure 3:
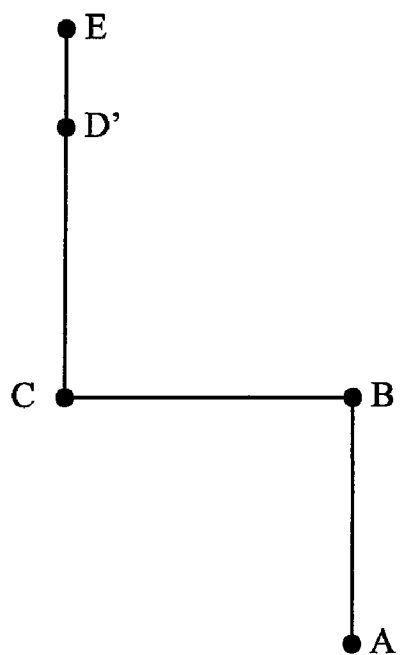
FIG. 3 is a diagram of the transit route of FIG. 1 with an existing stop replaced by a new stop.

Over time, it can become apparent that certain flexible stops are being requested at a high rate and possibly at a higher rate than existing stops. For example, as shown in FIG. 2, flexible stop D', located between stops D and E, has received numerous requests. Therefore, stop D' is added to the route. However, if, in addition, the number of passengers using stop D has shown a marked decrease, then the change in the stops along the route is made by adding new stop D' and removing old stop D, resulting in the new route of FIG. 3.

Of course, it is possible that there will be minimal use of the flexible stops by passengers, which could be interpreted as an indication that the route and stops are satisfactory in their current format.

Figure 4:
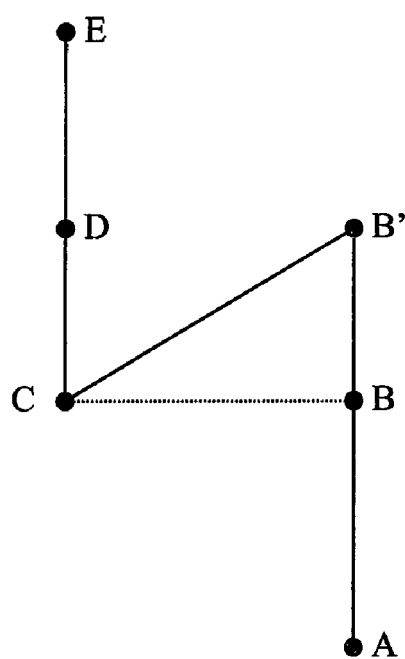
FIG. 4 is a diagram of the transit route of FIG. 1 with an additional deviation added to the route.

Another use of the flexible stop method is realized if, in addition to allowing flexible stops, the route itself is permitted to be changed as well. Again starting from the route shown in FIG. 1, passengers are now permitted to request a deviation from the route and not merely a change in the stop along the route. These deviations result in the addition of new course sections to the fixed route and the removal of existing course sections, if necessary. For example, as shown in FIG. 4, a new stop B' is requested, which results in the addition of a new course section in the route from stop B to stop C.

Figure 5:
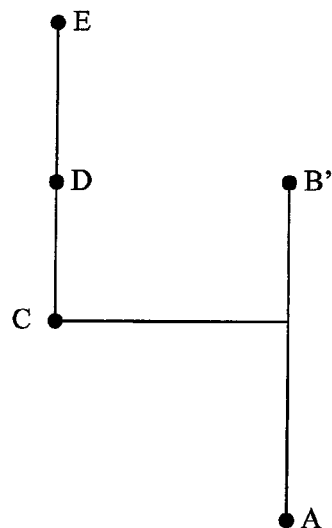
FIG. 5 is a diagram of the transit route of FIG. 1 with an additional deviation added to the route and an existing stop removed.

As described above, over time the number of requests for stop B' are recorded and compared against the number of passengers using existing stop B. If sufficient requests are recorded, then stop B' is added to the route as shown in FIG. 4. However, if in addition to the requests for stop B', the number of passengers using stop B has decreased, then stop B may be removed as well, as shown in FIG. 5.

It can be seen that in order to successfully gather the information about the passengers' usage of requested and existing stops, some form of passenger and vehicle tracking and data collection is required. However, methods of doing so are known in the art and it is expected that any of them should prove sufficient for data collection purposes. This data is then input into a decision-making algorithm which uses user-defined parameters to determine if stops should be added or deleted or if changes should be made to the route.

Additionally, if desired, the times at which the passenger requests are made may be recorded. By using this additional data in the algorithm, the modifications to the route may be restricted to certain time periods based on the pattern of requests.

The algorithm can also include additional restrictions to apply to the assessment of new stops. Limitations on the number of stops on a route, the number of stops on a given section of the route, accessibility restrictions (wheel chair ramps, elevators, etc.), accommodations (covered stop, benches, etc) or even limitations (minimum or maximum) on the distance between stops or other limitations can all be incorporated into the decision-making algorithm for new stops. Use of these limitations can assist in ensuring that new stops and routes meet the same criteria as old stops and routes.

Figure 6:
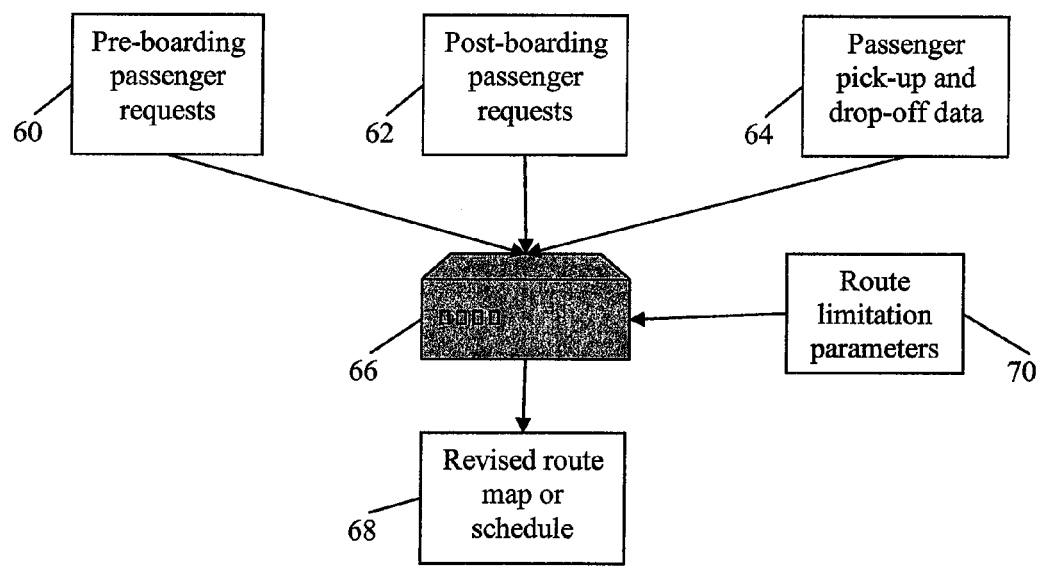
FIG. 6 is a diagram of the inputs and outputs for a system executing the method of determining changes to the fixed route.

The above method is preferably executed by a suitable equipped computer system as shown in FIG. 6. Passenger request data, both pre-boarding (60) and post-boarding (62), as well as the passenger pick-up and drop-off data (64) for each stop are fed into a computer 66. The computer 66 then inputs the collected data into the decision-making algorithm and produces a modified route map and/or schedule 68. Depending on the criteria used by the decision-making algorithm, additional data, such as route limitation parameters 70, may also be input.

Furthermore, it is contemplated that the granting of permission for passenger requests for deviations may be implemented in any desired fashion on the transit network. In a smaller network, deviations may be permitted on all routes, allowing for re-assessment of the entire network in one pass. In larger networks, permission may be granted on a route-by-route basis, allowing for progressive change over time without overwhelming the network with wholesale changes on all routes.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

What is claimed is:

1. A method of optimizing a fixed route on a transit network, comprising the steps of:
    a) permitting a vehicle providing service on said fixed route to make deviations from said fixed route based on passenger requests for said deviations received from passengers on said vehicle;
    b) tracking said deviations and the number of said passenger requests corresponding to each deviation;
    c) submitting information from said tracking step b) into a decision-making algorithm executing on a computer system; and
    d) modifying said fixed route to include new stops based on results from said decision-making algorithm.

2. The method of claim 1, wherein said step of modifying said fixed route further includes deleting existing stops from said fixed route.

3. The method of claim 1, wherein said passenger requests include requests for changes in stop locations along said fixed route.

4. The method of claim 1, wherein said passenger requests include requests for changes in course along said fixed route.

5. The method of claim 4, wherein said step of modifying said fixed route further includes changing said course for said fixed route to include locations defined by said deviations.

6. The method of claim 1, wherein said decision-making algorithm includes limitations on new and existing stops, including one or more of: maximum number of stops on a route, maximum number of stops on a specific section of a route, minimum distance between stops, and maximum distance between stops.

7. The method of claim 1, wherein said tracking step b) includes tracking times corresponding to said passenger requests such that modifications to said fixed route from step d) take place only during defined time periods.

8. A method of optimizing a fixed route on a transit network, comprising the steps of:
    a) permitting a vehicle providing service on said fixed route to make deviations from said fixed route based on passenger requests for said deviations made while riding said vehicle, said deviations including changes in stop locations and changes in course along said fixed route;
    b) tracking said deviations and the number of said passenger requests corresponding to each deviation;
    c) submitting information from said tracking step b) into a decision-making algorithm executing on a computer system; and
    d) modifying said fixed route to include changes to stop locations and changes in said course of said fixed route based on results from said decision-making algorithm.

9. A system for optimizing a fixed route on a transit network, comprising:
    a) a database containing information concerning deviations on said fixed route and the number of passenger requests corresponding to each deviation received from passengers on vehicles performing fixed transit routes; and
    b) a data processing unit for analyzing said information with respect to one of said fixed transit routes and determining which modifications, if any, are to be made to said one of said fixed transit routes.

10. The system of claim 9, wherein said data processing unit is additionally capable of analyzing multiple ones of said fixed transit routes in combination to determine which modifications, if any, are to be made to each of said multiple ones of said fixed transit routes.

11. The system of claim 9, wherein said modifications to said fixed route include one or more of: adding new stops, removing existing stops, add new course sections, and removing existing course sections.

12. A method of optimizing a fixed route on a transit network, comprising the steps of:

registering deviations made by a vehicle providing service in response to passenger requests for said deviations received from passengers on said vehicle, and the number of said passenger requests corresponding to each deviation;

processing said deviations and the number of passenger requests corresponding to each deviation using a decision-making algorithm executing on a computer system; and modifying said fixed route to include new stops based on results from said decision making algorithm.

13. The method of claim 12, wherein said step of modifying said fixed route further includes deleting existing stops from said fixed route.

14. The method of claim 12, wherein said passenger requests include requests for changes in stop locations along said fixed route.

15. The method of claim 12, wherein said passenger requests include requests for changes in course along said fixed route.

16. The method of claim 15, wherein said step of modifying said fixed route further includes changing said course for said fixed route to include locations defined by said deviations.

17. The method of claim 12, wherein said decision-making algorithm includes limitations on new and existing stops, including one or more of: maximum number of stops on a route, maximum number of stops on a specific section of a route, minimum distance between stops, and maximum distance between stops.

18. The method of claim 12, wherein said registering includes registering times corresponding to said passenger requests such that modifications to said fixed route take place only during defined time periods.

19. A method of optimizing a fixed route on a transit network, comprising the steps of:

registering deviations made by a vehicle providing service in response to passenger requests for said deviations received from passengers on said vehicle, and the number of said passenger requests corresponding to each deviation, said deviations including changes in stop locations and changes in course along said fixed route;

processing said deviations and the number of passenger requests corresponding to each deviation using a decision-making algorithm executing on a computer system; and modifying said fixed route to include new stops based on results from said decision making algorithm.

* * * * *